(12) United States Patent
Nodera et al.

(10) Patent No.: US 6,720,370 B2
(45) Date of Patent: *Apr. 13, 2004

(54) POLYCARBONATE COMPOSITION AND INJECTION MOLDING MADE THEREOF

(75) Inventors: Akio Nodera, Ichihara (JP); Naoki Mitsuta, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 70 days.

This patent is subject to a terminal disclaimer.

(21) Appl. No.: 10/060,257

(22) Filed: Feb. 1, 2002

(65) Prior Publication Data

US 2002/0115789 A1 Aug. 22, 2002

Related U.S. Application Data

(62) Division of application No. 09/388,530, filed on Sep. 2, 1999, now Pat. No. 6,369,142.

(30) Foreign Application Priority Data

Sep. 29, 1998 (JP) .............................. 10-274517
Sep. 29, 1998 (JP) .............................. 10-274519

(51) Int. Cl.⁷ ............................................ C08L 69/00
(52) U.S. Cl. ................... 523/436; 524/109; 524/114; 524/127; 524/141; 525/65; 525/67
(58) Field of Search ................ 524/109, 114, 524/127, 141; 525/65, 67; 523/436

(56) References Cited

U.S. PATENT DOCUMENTS

| 4,748,203 A | 5/1988 | Van Abeelen |
| 5,449,710 A | 9/1995 | Umeda |
| 5,580,924 A | 12/1996 | Wildi |
| 5,698,652 A | 12/1997 | Aoyama |
| 5,723,526 A | 3/1998 | Nagasawa |
| 5,837,757 A | 11/1998 | Nodera et al. |
| 5,871,570 A | 2/1999 | Koyama |
| 6,066,686 A | 5/2000 | Katayama |
| 6,150,443 A | 11/2000 | Nodera et al. |
| 6,197,857 B1 | 3/2001 | Nodera et al. |
| 6,331,584 B1 | 12/2001 | Nodera et al. |
| 6,369,142 B1 * | 4/2002 | Nodera |
| 6,486,241 B2 * | 11/2002 | Sawano |

FOREIGN PATENT DOCUMENTS

| EP | 658603 | 6/1995 |
| EP | 0 816 433 | 1/1998 |
| JP | 08-239565 | 9/1996 |

OTHER PUBLICATIONS

Patent Abstracts of Japan, vol. 1997, No. 01, Jan. 31, 1997, JP 08 239565, Sep. 17, 1996.
Abstract only of EP 767215.
Abstract only of EP 829517.
Abstract only of EP 909790.

* cited by examiner

Primary Examiner—David J. Buttner
(74) Attorney, Agent, or Firm—Oblon, Spivak, McClelland, Maier & Neustadt, P.C.

(57) ABSTRACT

A thermoplastic resin composition having 100 parts by weight of a resin mixture of (A) from 20 to 98% by weight of a polycarbonate resin and (B) from 2 to 80% by weight of a styrenic resin; from 0.1 to 20 parts by weight of (C) an epoxy-modified block copolymer; and from 0.5 to 20 parts by weight of (D) a grafted core/shell rubber elastomer, can be used in moldings which have a good surface layer peeling resistance and a good impact resistance. Further, a flame-retardant polycarbonate resin composition having 100 parts by weight of a resin or resin mixture of (A) from 20 to 100% by weight of a polycarbonate resin and (B) from 0 to 80% by weight of a styrenic resin; from 1 to 30 parts by weight of (E) a flame retardant of an organic phosphorus compound; and from 0.1 to 10 parts by weight of (D) an epoxy group-containing compound, exhibits good flame retardancy, and its injection moldings have good impact strength and yellowing resistance even in high-temperature and high-humidity conditions and can be recycled.

12 Claims, No Drawings

POLYCARBONATE COMPOSITION AND INJECTION MOLDING MADE THEREOF

This application is a division of application Ser. No. 09/388,530 filed Sep. 2, 1999, now U.S. Pat. No. 6,369,142.

BACKGROUND OF THE INVENTION

1. Field of the Invention

The present invention relates to a thermoplastic resin composition, precisely, to that having good moldability and capable of being molded into moldings, especially injection moldings applicable to, for example, office automation appliances, and other electric and electronic appliances for household. More precisely, the invention relates to a thermoplastic resin composition having good moldability and good resin compatibility and to its injection moldings having good impact resistance.

The invention also relates to a flame-retardant polycarbonate resin composition, precisely to that capable of being molded into good moldings having good flame retardancy, good thermal stability and good outward appearance, and to its injection moldings having good durability and good recyclability.

2. Description of the Related Art

As having the advantages of impact resistance, heat resistance and good electric properties, polycarbonate resins have many applications in various fields of, for example, office automation appliances, information appliances, electric and electronic appliances for industrial use and household use, car parts and building materials. However, there are some problems with polycarbonate resins in that they require high molding and processing temperatures and their melt fluidity is low.

On the other hand, moldings for housings and parts for office automation appliances and information appliances such as duplicators and facsimiles, and for other electric and electronic appliances are required to have a complicated shape with local projections or depressions, for example, having ribs or bosses therewith, and to be and thin-walled for reasons of weight and resources saving. Therefore, desired are polycarbonate resin compositions having increased melt fluidity, or that is, having increased injection moldability. Various polycarbonate resin compositions having increased melt fluidity and increased moldability have heretofore been proposed, to which are added rubber-modified styrenic resins in consideration of physical properties such as impact resistance of the moldings.

As mentioned hereinabove, polycarbonate resins are problematic in that they require high molding and processing temperatures and their melt fluidity is low. Because of such problems with them, the molding and working temperatures for polycarbonate resins are generally high. In particular, when some additives are added to them, the thermal stability of polycarbonate resins is often lowered when they are molded, and their moldings could not often exhibit the excellent properties intrinsic to polycarbonate resins. As a rule, polycarbonate resins are self-extinguishing. However, some of their applications to office automation appliances, information appliances, electric and electronic appliances for industrial use and for household use require high-level flame retardancy. To meet the requirement, various flame retardants are added to polycarbonate resins.

Compositions of polycarbonate resins, to which are added styrenic resins such as acrylonitrile-butadiene-styrene resins (ABS resins) or acrylonitrile-styrene resins (AS resins) for improving the melt fluidity of the compositions, and have many applications in the field of moldings, being polymer alloys with their typical good heat resistance and impact resistance. Though polycarbonate resins are self-extinguishing, their polymer alloys for office automation appliances, information appliances and other electric and electronic appliances are required to have higher flame retardancy of not lower than a predetermined level so as to ensure and increase the safety of their moldings for those applications.

To meet the requirements as above, various methods have heretofore been proposed. Concretely, Japanese Patent Laid-Open No. 55145/1986 discloses a thermoplastic resin composition comprising (A) an aromatic polycarbonate resin, (B) an ABS resin, (C) an AS resin, (D) a halogen compound, (E) a phosphate, and (F) a polytetrafluoroethylene component. Japanese Patent Laid-Open No. 32154/1990 discloses a molding polycarbonate composition with high flame retardancy and high impact resistance, comprising (A) an aromatic polycarbonate resin, (B) an ABS resin, (C) an As resin, (D) a phosphate, and (E) a polytetrafluoroethylene component.

In those compositions, however, the compatibility of the polycarbonate resin with the styrenic resin is not satisfactory. Therefore, the compositions are still problematic in that, when they are molded into large-sized moldings or thin-walled moldings in a rapid injection molding process, the resulting moldings are often troubled by surface layer peeling, and the impact resistance, especially the surface impact resistance of the moldings is poor. In addition, the flame-retardant compositions comprising a phosphate compound that serves as a flame retardant therein are further problematic in that they are readily degraded in high-temperature and high-humidity atmospheres and their recyclability is poor. Concretely, when the moldings of the compositions are re-melted and recycled, after having been once used in practice, then the impact resistance and other physical properties of the recycled moldings are often poor, and, in addition, the recycled moldings are often yellowed.

For improving the compatibility of a polycarbonate resin with a styrenic resin in a composition comprising the two resins, a method has been proposed of adding from 0.5 to 5 parts by weight of an epoxy-modified block copolymer to 100 parts by weight of the resin mixture, in which the epoxy-modified block copolymer added comprises polymer blocks of essentially a vinyl aromatic compound and polymer blocks of essentially a conjugated diene compound, the latter epoxidized at the unsaturated carbon—carbon double bond (see Japanese Patent Laid-Open No. 48894/1997). Another method has also been proposed of adding an organic phosphorus compound which serves as a flame retardant to that composition to prepare a flame-retardant resin composition (see Japanese Patent Laid-Open Nos. 324086/1997 and 168273/1998). These proposed compositions are characterized in that they have greatly improved impact resistance.

On the other hand, it is well known that adding a rubber-like polymer to a resin composition comprising a polycarbonate resin and a styrenic resin improves the impact strength of the resin composition. For example, Japanese Patent Laid-Open 3397/1996 discloses a flame-retardant, thermoplastic resin composition comprising (A) a polycarbonate resin, (B) an AS resin, (C) an ABS resin, (D) a composite rubber-type graft copolymer, and (E) a flame retardant; and Japanese Patent Laid-Open No. 239565/1996 discloses a polycarbonate resin composition comprising (A) an aromatic polycarbonate, (B) a rubber-based elastomer incorporated in an impact-resistant polystyrene resin, (C) a non-halogen phosphate, (D) a core/shell-type, grafted rubber-like elastomer, and (E) a polycarbonate resin substance containing talc.

The method of adding an epoxy-modified block copolymer to a polycarbonate-styrene composition in which the epoxy-modified block copolymer comprises polymer blocks with a vinyl aromatic compound as a main component and polymer blocks with a conjugated diene compound as a main component the latter epoxidized at the unsaturated carbon—carbon double bond, and also the method of adding a composite rubber-based graft copolymer thereto are both excellent in that the impact resistance of the resulting polymer compositions is greatly improved. However, in our experiments, we, the present inventors, have demonstrated that the impact resistance of the moldings of those resin compositions, especially the surface impact resistance thereof is not always satisfactory in practical use. In addition, we have further found that the moldings are often troubled by surface layer peeling and, in particular, the resistance to aging due to moisture of the moldings of the resin compositions that contains a phosphorus-containing flame retardant is not good.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent emphasis upon safety and environmental protection, the market requires flame retardation with non-halogen flame retardants. As non-halogen flame retardants, phosphorus-containing organic flame retardants, especially organic phosphate compounds may be added to polycarbonate resin compositions, for which various methods have been proposed. Concretely, for example, referred to are the techniques disclosed in Japanese Patent Laid-Open Nos. 55145/1986, 32154/1990 and 239565/1996.

The above all improve the melt fluidity of polycarbonates thereby improving the moldability thereof, and improve the impact resistance and the flame retardancy of polycarbonate moldings. With such their good properties, the moldings have many applications. However, in order to make the compositions characterized by a polycarbonate resin or by a polycarbonate resin and a rubber-modified styrenic resin and having good melt fluidity have good flame retardancy by adding thereto a phosphorus-containing, organic flame retardant, a relatively large amount of a flame retardant such as a phosphate compound must be added to the compositions. Though their flame-retarding ability is good, phosphate compounds often cause some problems when added to resin compositions. For example, they will corrode molds used for molding resin compositions, and, in addition, they will lower the impact strength of resin moldings or will yellow them in high-temperature conditions or in high-humidity conditions. With the recent tendency toward environmental protection and energy and resources saving, recycling resin moldings is desired. Specifically, in repeated re-melting and re-mixing used resin moldings for recycling them, it is desired that the physical properties of the recycled moldings are not degraded much and that the recycled moldings are not yellowed much.

SUMMARY OF THE INVENTION

In that situation, the first object of the present invention is to provide an improved thermoplastic resin composition comprising a polycarbonate resin and a styrenic resin and also its injection moldings well applicable to office automation appliances, information appliances, other electric and electronic appliances for industrial use and for household use, and also car parts. The composition has good moldability even when containing a flame retardant, and its moldings are not troubled by surface layer peeling and have good impact resistance, especially good surface impact resistance in practical use. Adding a flame retardant thereto does not interfere with the moldability of the resin composition and even with the impact resistance, the resistance to aging and the recyclability of the moldings of the composition.

The second object of the invention is to provide an improved, flame-retardant polycarbonate resin composition that contains an organic phosphorus compound, especially a non-halogen phosphate compound serving as a flame retardant therein, and to provide its injection moldings. The moldings have good flame retardancy and have good heat resistance and moisture resistance. Even when left in high-temperature and high-humidity conditions, they do not age much. Moreover, they have good recyclability, as they can be repeatedly melted with no problem for recycling them.

To attain the first object of the invention, we, the present inventors have assiduously studied various additives for their effects in improving the resin compatibility in resin compositions characterized by a polycarbonate resin and a styrenic resin and of improving the impact resistance of the moldings of the resin compositions. As a result, we have found that adding a combination of specific additives to a resin composition comprising a polycarbonate resin and a styrenic resin could solve the outstanding problems. On the basis of this finding, we have completed one aspect of the present invention.

To attain the second object of the invention, we have further studied how to improve the heat resistance and other physical properties of flame-retardant polycarbonate resin compositions containing a phosphorus-containing organic flame retardant. As a result, we have found that, when a specific additive is added to a polycarbonate resin composition which contains an organic phosphorus compound serving as a flame retardant therein, especially to that further containing a rubber-modified styrenic resin, then the aging resistance and the recyclability of the moldings of the composition are well improved without lowering the flame retardancy thereof. On the basis of this finding, we have completed another aspect of the invention.

Specifically, the invention provides the following:

(1) A thermoplastic resin composition comprising 100 parts by weight of a resin mixture of (A) from 20 to 98% by weight of a polycarbonate resin, (B) from 2 to 80% by weight of a styrenic resin, and from 0.1 to 20 parts by weight of (C) an epoxy group-containing compound component of an epoxy-modified block copolymer, which is derived from a block copolymer comprising polymer blocks with an aromatic vinyl compound as a main component and polymer blocks with a conjugated diene compound as a main component or from its partial hydrogenate by epoxidating the double bonds existing therein, and from 0.5 to 20 parts by weight of (D) a core/shell-type, grafted rubber-like elastomer as the rubber-like elastomer component.

(2) The thermoplastic resin composition of (1), wherein the resin mixture comprises (A) from 50 to 95% by weight of a polycarbonate resin and (B) from 5 to 50% by weight of a styrenic resin, and the styrenic resin is a rubber-modified styrenic resin.

(3) The thermoplastic resin composition of (1) or (2), which additionally contains from 0.1 to 30 parts by weight, relative to 100 parts by weight of the resin mixture of (A) and (B), of (E) a flame retardant.

(4) The thermoplastic resin composition of (3), wherein the flame retardant is a non-halogen phosphate.

(5) The thermoplastic resin composition of (3) or (4), which additionally contains from 0.05 to 5 parts by weight, relative to 100 parts by weight of the resin mixture of (A) and (B), of (F) a fluoro-olefinic resin.

(6) The thermoplastic resin composition of any one of (1) to (5), which additionally contains from 1 to 100 parts by weight, relative to 100 parts by weight of the resin mixture of (A) and (B), of (G) an inorganic filler.

(7) An injection molding of the thermoplastic resin composition of any one of (1) to (6).

(8) The injection molding of (7), which is for the housing or for parts of office automation appliances, information appliances, or other electric or electronic appliances for industrial use or household use.

The invention further provides the following:

(9) A flame-retardant polycarbonate resin composition comprising 100 parts by weight of a resin or resin mixture of (A), from 20 to 100% by weight of a polycarbonate resin, and (B) from 0 to 80% by weight of a styrenic resin, and from 1 to 30 parts by weight of (E) a flame retardant of an organic phosphorus compound, and from 0.1 to 10 parts by weight of (C) an epoxy group-containing compound.

(10) The flame-retardant polycarbonate resin composition of (9), wherein the resin mixture comprises (A) from 50 to 95% by weight of a polycarbonate resin and (B) from 5 to 50% by weight of a styrenic resin, and the styrenic resin is a rubber-modified styrenic resin.

(11) The flame-retardant polycarbonate resin composition of (9) or (10), wherein the flame retardant is a non-halogen phosphate.

(12) The flame-retardant polycarbonate resin composition of any one of (9) to (11), which additionally contains from 0.05 to 5 parts by weight, relative to 100 parts by weight of the resin or resin mixture of (A) and (B), of (F) a fluoro-olefinic resin.

(13) The flame-retardant polycarbonate resin composition of any one of (9) to (12), which additionally contains from 1 to 30 parts by weight, relative to 100 parts by weight of the resin or resin mixture of (A) and (B), of (D) a rubber-like elastomer component of a core/shell-type, grafted rubber-like elastomer.

(14) The flame-retardant polycarbonate resin composition of any one of (9) to (13), which additionally contains from 1 to 100 parts by weight, relative to 100 parts by weight of the resin or resin mixture of (A) and (B), of (G) an inorganic filler.

(15) An injection molding of the flame-retardant polycarbonate resin composition of any one of (9) to (14).

(16) The injection molding of (15), which is for the housing or parts of office automation appliances, information appliances, or other electric or electronic appliances for the industrial use or household use.

DETAILED DESCRIPTION OF THE INVENTION

The invention is described in detail hereinunder. First mentioned are the components (A) to (E) constituting the thermoplastic resin composition and the flame-retardant polycarbonate resin composition of the invention.
(A) Polycarbonate Resin (PC):

The polycarbonate resin (PC) serving as the component (A) in the thermoplastic resin composition and the flame-retardant polycarbonate resin composition of the invention is not specifically defined, and may be any and every one known in the art. Generally used are aromatic polycarbonates to be produced by reacting diphenols and carbonate precursors. For example, used are polycarbonates as produced by reacting a diphenol and a polycarbonate precursor by a solution method or by a melt method, such as those as produced through reaction of a diphenol and phosgene or through interesterification of a diphenol and a diphenyl carbonate.

Various diphenols are usable, including, for example, 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes; and also bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ether, bis (4-hydroxyphenyl) ketone. Halogen-substituted derivatives of those diphenols are also usable in the thermoplastic resin composition of the invention.

As the diphenols for use herein, preferred are bis (hydroxyphenyl)alkanes, especially those with bisphenol A as a main raw material. The carbonate precursors for use in the invention include, for example, carbonyl halides, carbonyl esters, and haloformates, concretely, phosgene, diphenol dihaloformates, diphenyl carbonate, dimethyl carbonate, and diethyl carbonate. Other diphenols such as hydroquinone, resorcinol, and catechol are also usable in the invention. The diphenols mentioned herein may be used either singly or combined.

The polycarbonate resin may have a branched structure, for which the branching agent includes, for example, 1,1,1-tris(4-hydroxyphenyl)ethane, $\alpha$, $\alpha'$,$\alpha''$-tris(4-hyroxyphenyl)-1,3,5-triisopropylbenzene, phloroglucine, trimellitic acid, and isatin-bis(o-cresol). For controlling the molecular weight of the polycarbonate resin, for example, employable are phenol, p-t-butylphenol, p-t-octylphenol, and p-cumylphenol.

The polycarbonate resin for use in the invention may be a copolymer having a polycarbonate moiety and a polyorganosiloxane moiety, or it may have as a moiety this copolymer. The copolymer may be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention. In view of its mechanical strength and moldability, the polycarbonate resin to be the component (A) in the invention preferably has a viscosity-average molecular weight of from 10,000 to 100,000, more preferably from 14,000 to 40,000. Where the resin composition of the invention contains a non-halogen phosphate serving as a flame retardant therein, it is desirable that the polycarbonate resin constituting the composition does not have a halogen in its structure.
(B) Styrenic Resin:

The styrenic resin to be the component (B) in the thermoplastic resin composition or the flame-retardant polycarbonate resin composition of the invention may be a polymer as prepared through polymerization of a monomer or monomer mixture of from 20 to 100% by weight of a monovinylic aromatic monomer such as styrene or $\alpha$-methylstyrene, from 0 to 60% by weight of a vinyl cyanide-based monomer such as acrylonitrile or methacrylonitrile, and from 0 to 50% by weight of any other vinylic monomer copolymerizable with those monomers, such as maleimide or methyl (meth) acrylate. The polymer includes, for example, polystyrenes (GPPS), acrylonitrile-styrene copolymers (AS resins).

As the styrenic resin, also preferably used herein are rubber-modified styrenic resins. The rubber-modified styrenic resins are preferably impact-resistant styrenic resins as produced through grafting polymerization of rubber with at least one styrenic monomer. The rubber-modified styrenic resins include, for example, impact-resistant polystyrenes (HIPS) as produced through polymerization of rubber such as polybutadiene with styrene; ABS resins as produced through polymerization of polybutadiene with acrylonitrile and styrene; MBS resins as produced through polymerization of polybutadiene with methyl methacrylate and styrene. These rubber-modified styrenic resins may be combined, or may be mixed with other styrenic resins not modified with rubber such as those mentioned above, and the resin mixtures may be used in the invention.

In the rubber-modified styrenic resins, the amount of rubber to modify them may fall, for example, between 2 and 50% by weight, but preferably between 5 and 30% by weight, more preferably between 5 and 15% by weight. If the rubber content is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will generate gels or coloring. Specific examples of rubber for use herein include polybutadiene, acrylate and/or methacrylate-containing rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, and ethylene-propylene rubber. Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

(C) Epoxy Group-Containing Compound:

The epoxy group-containing compound to be in the flame-retardant polycarbonate resin composition of the invention is a compound having at least one or more epoxy groups in the molecule. Preferably, it does not have a halogen. Concretely, it includes, for example, epoxidized soybean oil, epoxidized linseed oil, epoxybutyl stearate, epoxyoctyl stearate, phenyl glycidyl ether, allyl glycidyl ether, p-butylphenyl glycidyl ether, styrene oxide, neohexene oxide, diglycidyl adipate, diglycidyl sebacate, diglycidyl phthalate, bis-epoxydicyclopentadienyl ether, ethylene glycol diglycidyl ether, propylene glycol diglycidyl ether, polyethylene glycol diglycidyl ether, butadiene diepoxide, tetraphenylethylene epoxide, epoxidated polybutadiene, epoxidated styrene-butadiene copolymer, epoxidated hydrogenated styrene-butadiene copolymer, bisphenol A-type epoxy compounds, bisphenol S-type epoxy compounds, phenol-novolak-type epoxy compounds, resorcinol-type epoxy compounds, as well as alicyclic epoxy compounds such as 3,4-epoxycyclohexamethyl 3,4-epoxycyclohexylcarboxylate, 3,4-epoxycyclohexyl glycidyl ether. These may be used either singly or as combined.

In the thermoplastic resin composition of the invention, the epoxy group-containing compound must use a specific epoxy-modified block copolymer. The epoxy-modified block copolymer to be in the thermoplastic resin composition of the invention is prepared from a block copolymer comprising polymer blocks (S) with an aromatic vinyl compound as a main component and polymer blocks (B) with a conjugated diene compound as a main component or from a hydrogenated block copolymer, the partial hydrogenate of a block copolymer, by epoxidating the double bonds derived from the conjugated diene compound moiety therein. The aromatic vinyl compound that constitutes the block copolymer includes, for example, styrene, α-methylstyrene, p-methylstyrene, vinyltoluene, and divinylbenzene, which may be combined. Preferred is styrene.

The conjugated diene compound that also constitutes the block copolymer includes, for example, butadiene, isoprene, 1,3-pentadiene, and 2,3-dimethyl-1,3-butadiene, which may be combined. Preferred are butadiene, isoprene and a combination of the two. The copolymerizing ratio (by weight) of aromatic vinyl compound/conjugated diene compound in the block copolymer falls between 5/95 and 70/30, but preferably between 10/90 and 60/40.

The block copolymer may have any desired molecular structure of, for example, linear, branched and radial molecular structures. For example, its polymerb locks (S) and polymer blocks (B) may be in the structure S—B—S, B—S—B—S, S—B—S—B—S, or (S—B—)$_4$—Si. The block copolymer may be partially hydrogenated. Its molecular weight falls generally between 5,000 and 600,000, but preferably between 10,000 and 400,000. Preferably, its molecular weight distribution [weight-average molecular weight (Mw)/number-average molecular weight (Mn)] is at most 10.

For modifying them, the block copolymer or its partial hydrogenate may be reacted with an epoxidating agent of, for example, hydrogen peroxide, hydroperoxides such as tert-butyl hydroperoxide or cumene hydroperoxide, or peracids such as peracetic acid or perbenzoic acid, in an inert solvent. The epoxy-modified block copolymers are commercially available, for example, as Epofriend A1020 and Epofriend A1005, both from Daicel Chemical Industries.

(D) Rubber-Like Elastomer:

The rubber-like elastomer that may be in the flame-retardant polycarbonate resin composition of the invention includes, for example, polybutadiene, polyisoprene, styrene-butadiene-styrene (SBS) rubber, styrene-butadiene rubber (SBR), butadiene-acrylic rubber, isoprene-styrene rubber, isoprene-acrylic rubber, ethylene-propylene rubber, ethylene-propylene-diene rubber, and siloxane rubber.

The rubber-like elastomer to be in the thermoplastic resin composition of the invention must be a core/shell-type, grafted rubber-like elastomer. The core/shell-type, grafted rubber-like elastomer to be in the thermoplastic resin composition of the invention has a two-layered structure composed of a core and a shell, in which the core is of a flexible rubber material and the shell that covers the core is of a hard resin material. As a whole, the elastomer itself is powdery or granular. After blended with a polycarbonate resin and a styrenic resin in melt, the core/shell-type, grafted rubber-like elastomer of that type mostly keeps its original powdery or granular condition. Since the rubber-like elastomer keeps its original powdery or granular condition after having been blended with the resin melt, it is effective for preventing the moldings of the resin composition from being troubled by surface layer peeling. The core/shell-type, grafted rubber-like elastomer is preferably used as an optional component that may be in the flame-retardant polycarbonate resin composition of the invention.

Known are various core/shell-type, grafted rubber-like elastomers that are usable herein. Commercially-available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon).

Above all, preferred are those to be produced through polymerization of one or more vinylic monomers in the presence of a rubber-like polymer as obtained from monomers of essentially alkyl acrylates or alkyl methacrylates and dimethylsiloxane. In the alkyl acrylates and methacrylates, the alkyl group preferably has from 2 to 10 carbon atoms. Concretely, the alkyl acrylates and methacrylates include, for example, ethyl acrylate, butyl acrylate, 2-ethylhexyl acrylate, and n-octyl methacrylate.

One example of the rubber-like elastomers as obtained from monomers in large part of those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, and styrene. To prepare the polymer, a polyfunctional monomer serving as a crosslinking agent, such as divinylbenzene, ethylene dimethacrylate, triallyl cyanurate, or triallyl isocyanurate, may be added to the polymerization system.

The vinylic monomers to be polymerized in the presence of a rubber-like polymer include, for example, aromatic vinyl compounds such as styrene, α-methylstyrene; acrylates such as methyl acrylate, ethyl acrylate; and methacrylates such as methyl methacrylate, ethyl methacrylate. One or more of these monomers may be (co)polymerized, among themselves, or may be copolymerized with any other vinylic polymers such as vinyl cyanide compounds (e.g., acrylonitrile, methacrylonitrile), and vinyl esters (e.g., vinyl acetate, vinyl propionate). The (co)polymerization may be effected in any known method; for example, bulk polymerization, suspension polymerization, emulsion polymerization. Preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane component and from 5 to 95% by weight of a polyacryl (meth) acrylate rubber component as so entangled that they cannot be separated from each other, and has a mean grain size of from 0.01 to 1 μm, preferably from 0.02 to 0.6 μm. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

(E) Flame Retardant:

Comprising the components (A), (B), (C) and (D), the thermoplastic resin composition attains the essential object of the invention. However, where the moldings of the composition are for office automation appliances, information appliances, and other electric and electronic appliances, there often is demand for high-level flame retardancy. For these, a flame retardant shall be added to the composition as an additional component (E). The flame retardant is not specifically defined, and may be any conventional one. For example, any of the following well known compounds: organic phosphorus compounds, non-halogen phosphorus compounds, silicon compounds, halogen compounds, nitrogen compounds, metal hydroxides, red phosphorus, antimony oxides, or expanding graphite may be added to the composition, depending on the object of the composition.

The halogen compounds include, for example, tetrabromobisphenol A, halogenopolycarbonates, halogenopolycarbonate copolymers or oligomers, decabromodiphenyl ether, halogenopolystyrenes, and halogenopolyolefins. The nitrogen compounds include, for example, melamine, and alkyl group or aromatic group-substituted melamines; the metal hydroxides include, for example, magnesium hydroxide, and aluminium hydroxide. Halogen-containing flame retardants are relatively effective, but are not preferred, as they often discharge harmful substances when moldings comprising them are incinerated. Therefore, preferred are non-halogen flame retardants, as they are safe and do not pollute the environment.

One example of non-halogen flame retardants is a non-halogen, phosphorus-containing organic flame retardant. Any organic compounds containing phosphorus but not containing halogen are employable herein with no limitation, so far as they serve as flame retardants. Especially preferred are phosphate compounds having at least one esteric oxygen atom directly bonding to a phosphorus atom. Other examples of non-halogen flame retardants other than organic phosphorus compounds are red phosphorus, and also silicone flame retardants such as silicone oils and silicone resins. The silicone flame retardants include, for example, silicone compounds having a specific structure with a reactive group such as an alkoxy group or an epoxy group, as well as silicone resins having a specific molecular weight in which the recurring units have different amounts of oxygen (see Japanese Patent Laid-Open Nos. 306265/1994, 336547/1994, 176425/1996, 139964/1998).

The flame-retardant polycarbonate resin composition of the invention contains a non-halogen, phosphorus-containing organic flame retardant. Any organic compounds containing phosphorus but not containing halogen are employable in the composition with no limitation, so far as they serve as flame retardants. Preferred are non-halogen phosphate compounds having at least one esteric oxygen atom directly bonding to a phosphorus atom.

As non-halogen phosphate compounds, for example, usable are those of the following formula (1):

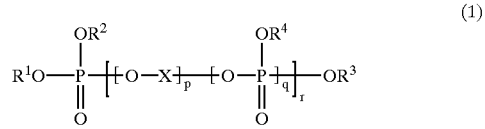

(1)

wherein $R^1$, $R^2$, $R^3$ and $R^4$ each independently represent a hydrogen atom or an organic group; X represents a divalent or higher polyvalent organic group; p is 0 or 1; q is an integer larger than 0; and r is a non-negative integer.

In formula (I), the organic group includes, for example, substituted or unsubstituted alkyl, cycloalkyl and aryl groups. The substituents for the substituted groups include, for example, alkyl groups, alkoxy groups, aryl groups, aryloxy groups, and arylthio groups. These substituents may be combined to give arylalkoxyalkyl groups, or may be bonded, for example, using oxygen, nitrogen or sulfur atom to give arylsulfonylaryl groups.

In formula (I), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, and groups as derived from bisphenols of polycyclic phenols. Preferred are groups derived from bisphenol A, hydroquinone, resorcinol, diphenylmethane, dihydroxydiphenyl, and dihydroxynaphthalene.

The non-halogen phosphate compounds may be monomers, oligomers, polymers or their mixtures. Concretely, they include, forexample, trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri (2-ethylhexyl) phosphate, diisopropylphenyl phosphate, trixylenyl phosphate, tris(isopropylphenyl) phosphate, tributyl phosphate, bisphenol A bisphosphate, hydroquinone bisphosphate, resorcinol bisphosphate, resorcinol-diphenyl phosphate, trihydroxybenzene triphosphate, and cresyldiphenyl phosphate.

Commercially-available, non-halogen phosphates that are preferably used as the component (E) in the invention are, for example, TPP [triphenyl phosphate], TXP [trixylenyl phosphate], CR733S [resorcinol (diphenyl phosphate)], CR741 [bisphenol A (diphenyl phosphate)], PX200 [1,3-phenylene-tetrakis(2,6-dimethylphenyl) phosphate], PX201 [1,4-phenylene-tetrakis (2,6-dimethylphenyl) phosphate], and PX202 [4,4'-biphenylene-tetrakis(2,6-dimethylphenyl) phosphate], all from Daihachi Chemical Industry.

The proportions of the essential components (A) to (D) and the optional component (E) that constitute the thermoplastic resin composition of the invention are described. In the resin mixture of the polycarbonate resin (A) and the styrenic resin (B) in the composition, the amount of the polycarbonate resin (A) is from 20 to 98% by weight and that of the styrenic resin (B) is from 2 to 80% by weight, but preferably the former is from 50 to 95% by weight and the latter is from 5 to 50% by weight, more preferably, the former is from 60 to 90% by weight and the latter is from 10 to 40% by weight. If the polycarbonate resin content of the resin mixture is smaller than 20% by weight, the heat resistance and the strength of the moldings of the composition will be poor; but if larger than 98% by weight, the melt fluidity of the composition will be poor and the moldability of the composition will be therefore poor.

As the styrenic resin (B), preferred is a rubber-modified styrenic resin such as that mentioned hereinabove. Especially preferably, the resin mixture in the composition comprises from 50 to 95% by weight of a polycarbonate resin (A) and from 5 to 50% by weight of a rubber-modified styrenic resin (B). The proportions of the resins constituting the resin mixture in the composition may be appropriately determined, depending on the characteristics of the resins, such as the molecular weight and the melt index of the polycarbonate resin, the type, the molecular weight and the melt index of the styrenic resin, and the rubber content of the resin mixture, and also on the necessary properties, the use, the size and the thickness of the moldings to be formed from the composition.

The amount of the component (C) of an epoxy-modified block copolymer, which is derived from a block copolymer comprising polymer blocks with an aromatic vinyl compound as a main component and polymer blocks with a conjugated diene compound as a main component or by epoxidizing the double bonds in its partial hydrogenate forming a epoxy-modified copolymer block, is from 0.1 to 20 parts by weight, relative to 100 parts by weight of the resin mixture of (A) and (B), but preferably from 0.2 to 15 parts by weight, more preferably from 0.3 to 10 parts by weight. If its amount is smaller than 0.1 parts by weight, the component (C) poorly exhibits the ability to improve the resin compatibility of the composition. If so, the moldability of the composition will be poor, and, in addition, the surface layer peeling resistance and the impact resistance of the moldings of the composition will be also poor. If, on the other hand, the amount of the component (C) is larger than 20 parts by weight, the heat resistance, the rigidity and the flame retardancy of the moldings of the composition will be poor. Therefore, the amount of the component (C) to be in the composition shall be comprehensively determined, depending on the necessary properties of the moldings of the composition and on the amount of the other constituent components of flame retardant, rubber-like elastomer, and inorganic filler, considered comprehesively.

The amount of the component (D) of a core/shell-type, grafted rubber-like elastomer to be in the composition is from 0.5 to 20 parts by weight, relative to 100 parts by weight of the resin mixture of (A) and (B), but preferably from 1 to 15 parts by weight, more preferably from 1 to 10 parts by weight. If its amount is smaller than 0.5 parts by weight, the component (D) poorly exhibits the ability to improve the surface layer peeling resistance and the impact resistance of the moldings of the composition. If, on the other hand, the amount of the component (D) is larger than 20 parts by weight, the heat resistance and the rigidity of the moldings of the composition will be poor. Accordingly, the first object of the invention is attained by the component (D) when the amount is not larger than 20 parts by weight. Anyhow, the amount of the component (D) shall be determined, depending on the necessary properties of the moldings of the composition and on the amount of the other constituent components of flame retardant, rubber-like elastomer, and inorganic filler, considered comprehensively. In the first aspect of the invention, the combined use of the components (C) and (D) for the thermoplastic resin composition is indispensable, in which the ratio of (C) to (D), (C)/(D), is generally from 3/97 to 40/60, but preferably from 5/95 to 50/50.

The flame retardant of the optional component (E) may be in the composition, generally in an amount of from 0.1 to 30 parts by weight, but preferably from 0.2 to 20 parts by weight, relative to 100 parts by weight of the resin mixture of (A) and (B). The flame retardant content of the composition may be suitably determined, depending on the type and the efficacy of the flame retardant and on the necessary flame retardancy of the moldings of the composition. When a phosphate compound is used as the flame retardant, its amount may fall between 1 and 25 parts by weight, preferably between 2 and 20 parts by weight.

Next described are the proportions of the essential components (A), (C) and (E) and the optional components (B) and (D) that constitute the flame-retardant polycarbonate resin composition of the invention. In the flame-retardant polycarbonate resin composition of the invention, the styrenic resin of the optional component (B) has no direct relation to the flame retardancy of the composition, but is added to the composition for specifically improving the melt fluidity of the polycarbonate resin to be in the composition. Regarding the proportions of the polycarbonate resin (A) and the styrenic resin (B), the amount of the polycarbonate resin (A) is generally from 20 to 100% by weight, but preferably from 50 to 95% by weight, and that of the styrenic resin (B) is from 0 to 80% by weight, but preferably from 5 to 50% by weight. If the proportion of the polycarbonate resin (A) is smaller than 20% by weight, the heat resistance and the strength of the moldings of the composition will be poor. If the proportion of the styrenic resin (B) is smaller than 5% by weight, the styrenic resin (B) poorly exhibits the ability to improve the moldability of the composition. As the styrenic resin (B), preferred is a rubber-modified styrenic resin such as that mentioned hereinabove. The proportions of the resins (A) and (B) to be in the composition may be appropriately determined, depending on the molecular weight of the polycarbonate resin, the type, the molecular weight and the melt index of the styrenic resin, the rubber content of the resin component, and also on the use, the size and the thickness of the moldings to be formed from the composition.

The amount of the organic phosphorus compound of the flame retardant (E) to be in the composition is from 1 to 30 parts by weight, relative to 100 parts by weight of the resin component (A) and (B), but preferably from 2 to 25 parts by weight, more preferably from 3 to 20 parts by weight. If its amount is smaller than 1 part by weight, the flame retardant (E) hardly exhibits any ability to retard flame. If, however, it is larger than 30 parts by weight, the heat resistance and the impact strength of the moldings of the composition will be poor. Therefore, the flame retardant content of the composition may be suitably determined, depending on the necessary flame retardancy of the moldings of the composition and on the type of the flame retardant and also on the amount of the other components of rubber-like elastomer and inorganic filler.

The amount of the component (C) of an epoxy group-having compound is from 0.1 to 10 parts by weight, relative to 100 parts by weight of the resin component of (A) and (B). If its amount is smaller than 0.1 part by weight, the component (C) could poorly exhibits the ability to improve the yellowing resistance, the silver mark resistance, the heat resistance, the moisture resistance and the recyclability of the moldings of the composition. If, on the other hand, the amount of the component (C) is larger than 10 parts by weight, physical properties (impact resistance or the like) of the moldings of the composition will be poor. Though its effect is not clear, it is believed that the epoxy group-containing compound will react with degraded products of the organic phosphorus compound of the flame retardant (E) to inactivate them, thereby preventing the degraded products from having some negative influences on the polycarbonate resin in the composition.

The flame-retardant polycarbonate resin composition of the invention may contain a rubber-like elastomer as the optional component (D), which is effective for further improving the impact resistance of the moldings of the composition. The elastomer content of the composition may fall between 1 and 30 parts by weight, but preferably between 2 and 20 parts by weight, relative to 100 parts by weight of the resin component (A) and (B). The elastomer content is determined based on the necessary impact resistance, heat resistance and rigidity of the moldings of the composition, considered comprehensively.

The thermoplastic resin composition and the flame-retardant polycarbonate resin composition of the invention may contain a fluoro-olefinic resin as the optional component (F), which is effective in preventing resin melt-dripping when the composition is fired. The fluoro-olefinic resin (F) is a polymer having a fluoro-ethylenic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. All types of polytetrafluoroethylene known in the art are usable herein.

More preferred is polytetrafluoroethylene having the ability to form fibrils, as its property of preventing resin melts from dripping is better. The type of fibril-forming polytetrafluoroethylene (PTFE) is not specifically defined, but available is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), and CD-076 (from Asahi ICI Fluoropolymers).

Others besides PTFE of Type 3 are also employable herein, including, for example, Argoflon F5 (from Montefluos), Polyflon MPA and FA-100 (both from Daikin Industry). These polytetrafluoroethylenes (PTFEs) may be used either singly or combined. The fibril-forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefinic resin content of the composition may fall between 0.05 and 5 parts by weight, but preferably between 0.1 and 2 parts by weight relative to 100 parts by weight of the resin component of (A) and (B). If the fluoro-olefinic resin content is smaller than 0.05 parts by weight, the resin melt-dropping preventing ability of the composition will be not enough for the intended flame retardancy of the composition. However, even if the content is larger than 5 parts by weight, the effect of the fluoro-olefinic resin added can not be augmented, and such a large amount of the fluoro-olefinic resin, if added to the composition, will have some negative influence on the impact resistance and the outward appearance of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

The thermoplastic resin composition and the flame-retardant polycarbonate resin composition of the invention may further contain an inorganic filler as the optional component (G), which is to further increase the rigidity and the flame retardancy of the moldings of the composition. The inorganic filler includes, for example, talc, mica, kaolin, diatomaceous earth, calcium carbonate, calcium sulfate, barium sulfate, glass fibers, carbon fibers, and potassium titanate fibers. Of those, preferred are tabular fillers of talc or mica, and fibrous fillers. Talc is a hydrous silicate of magnesium, and any commercially-available products of it are employable herein. Talc may contain a minor amount of aluminium oxide, calcium oxide and iron oxide, in addition to the essential components of silicic acid and magnesium oxide. In producing the resin composition of the invention, any talc even containing such minor components is employable. The inorganic filler such as talc for use in the invention generally has a mean grain size of from 0.1 to 50 μm, but preferably from 0.2 to 20 μm. Containing the inorganic filler as above, especially talc, the rigidity of the moldings of the invention is further increased and, in addition, the amount of the flame retardant non-halogen phosphate to be in the composition can be reduced.

The amount of the component (G), inorganic filler that may be in the composition of the invention may fall between 1 and 100 parts by weight, but preferably between 2 and 50 parts by weight, relative to 100 parts by weight of the resin component of (A) and (B). If its amount is smaller than 1 part by weight, the inorganic filler added can not satisfactorily exhibit the effect of improving the rigidity and the flame retardancy of the moldings of the composition. However, if the amount of the inorganic filler is larger than 100 parts by weight, the impact resistance of the moldings will lower and the melt fluidity of the composition will lower. The amount of the inorganic filler to be in the composition maybe suitably determined, depending on the necessary properties of the moldings and the moldability of the composition, especially on the thickness of the moldings and the spiral flow length of the composition.

Apart from the essential components (A), (B), (C) and (D) and at least one optional component selected from (E) to (G) that constitute the thermoplastic resin composition of the invention, and also apart from the essential components (A), (D) and (E) and at least one optional component selected from (B), (D), (F) and (G) that constitutes the flame-retardant polycarbonate resin composition of the invention, the compositions may additionally contain any other additives which are generally added to ordinary thermoplastic resins, if desired. The additives are for further improving the moldability of the compositions and also the impact resistance, the outward appearance, the weather resistance and the rigidity of the moldings of the composition. For example, the additives include phenolic, phosphorus-containing or sulfur-containing antioxidants, antistatic agents, polyamide-polyether block copolymers (for permanent static electrification resistance), benzotriazole-based or benzophenone-based UV absorbents, hindered amine-based light stabilizers (weather-proofing agents), microbicides, compatibilizers, and colorants (dyes, pigments). The amount of the optional additive that may be in the resin compositions of the invention is not specifically defined, provided that it does not interfere with the properties of the compositions.

Methods for producing the resin compositions of the invention are described. The thermoplastic resin composition of the invention may be produced by mixing and kneading the components (A), (B), (C) and (D) in a predetermined ratio as above, along with the optional components (E) to (G) and with other additives as needed as above in any desired ratio. The flame-retardant polycarbonate resin composition of the invention may be produced by mixing and kneading the components (A), (C) and (E) in a predetermined ratio as above, along with the optional components (B), (D), (F) and (G) and with other additives as needed as above in any desired ratio.

Formulating and mixing them may be effected in any known manner, for example, by pre-mixing them in an ordinary device, such as a ribbon blender or a drum tumbler, followed by further kneading the resulting pre-mix in a Henschel mixer, a Banbury mixer, a single-screw extruder, a double-screw extruder, a multi-screw extruder, or a cokneader. The temperature at which the components are mixed and kneaded generally falls between 240 and 300° C. Other components than the polycarbonate resin and the styrenic resin may be previously mixed with the polycarbonate or styrenic resin or with any other thermoplastic resin to prepare a master batch, as one way of adding the other constituent components.

Having been prepared in the manner noted above, the thermoplastic resin composition or the flame-retardant polycarbonate resin composition of the invention may be molded into various moldings in the melt-molding devices as above, or, after it is pelletized, the resulting pellets may be molded into various moldings through injection molding, injection compression molding, extrusion molding, blow molding, press molding, vacuum molding or foaming. Especially preferably, the composition is pelletized in the melt-kneading manner as above, and the resulting pellets are molded into moldings through injection molding or injection compression molding. For injection molding of the composition, preferred is a gas-introducing molding method so as to prevent inverted blisters around the moldings and to reduce the weight of the moldings.

Moldings of the thermoplastic resin composition or the flame-retardant polycarbonate resin composition of the invention as produced through injection molding or injection compression molding are usable as the housing and as various parts of office automation appliances, information appliances and other electric and electronic appliances for household or industrial use, such as duplicators, facsimiles, televisions, radios, tape recorders, video decks, personal computers, printers, telephones, information terminals, refrigerators, and microwave ranges. The moldings have still other applications, and are usable, for example, as car parts.

The invention is described in more detail with reference to the following Examples and Comparative Examples, which, however, are not intended to restrict the scope of the invention.

EXAMPLES 1 TO 9, AND COMPARATIVE EXAMPLES 1 TO 5

The components shown in Table 1 and Table 2 below were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. To all compositions of Examples and Comparative Examples, added were 0.2 parts by weight of Irganox 1076 (from Ciba Specialty Chemicals) and 0.1 parts by weight of Adekastab C (from Asahi Denka Industry) both serving as an antioxidant. The resulting pellets were dried at 80° C. for 12 hours, and then molded into test pieces through injection molding at 260° C. These pellets and test pieces were tested for their properties, and their data obtained are shown in Table 1 and Table 2.

The materials used for producing the test samples, and the methods for testing the samples are mentioned below. Molding Materials:
(A) Polycarbonate Resin:
PC: Toughlon A1900 (from Idemitsu Petrochemical).
This is a bisphenol A polycarbonate resin having MI of 20 g/10 min (at 300° C., under a load of 1.2 kg), and a viscosity-average molecular weight of 19000.
(B) Styrenic Resin:
HIPS-1: Impact-resistant polystyrene resin (HIPS), Idemitsu PS IT44 (from Idemitsu Petrochemical).
This is a styrene-grafted polybutadiene having a rubber content of 10% by weight and MI of 8 g/10 min (at 200° C., under a load of 5 kg)
HIPS-2: Impact-resistant polystyrene resin (HIPS), Idemitsu PS HT44 (from Idemitsu Petrochemical).
This is a styrene-grafted polybutadiene having a rubber content of 7% by weight and MI of 8 g/10 min (at 200° C., under a load of 5 kg).
ABS: Acrylonitrile-butadiene-styrene copolymer (ABS), DP-611 (from Technopolymer).
This has MI of 2 g/10 min (at 200° C., under a load of 5 kg)

(C) Epoxy Group-Having Compound:
Epoxidated SBS: Epofriend A1020 (from Daicel Chemical Industries), having a butadiene content of 60% by weight and an epoxy equivalent of 400.
DE-1: 3,4-Epoxycyclohexylmethyl-3,4-epoxycyclohexylcarboxylate.
DE-2: Bisphenol A-type epoxy resin, having an epoxy equivalent of 2000.
DE-3: Epoxidized soybean oil.
(D) Rubber-Like Elastomer (Core/Shell-Type, Grafted Rubber-Like Elastomer):
Composite rubber-type graft copolymer: Metablen S2001 (from Mitsubishi Rayon), having a polydimethylsiloxane content of at least 50% by weight.
(E) Flame Retardant (Organic Phosphorus Compound):
P-1: Phosphate PFR (from Asahi Denka Industry). This is resorcinol bis(diphenyl phosphate).
P-2: TPP (from Daihachi Chemical). This is triphenyl phosphate.
(F) Fluoro-Olefinic Resin:
PTFE: F210L (fromDaikin Chemical Industry), having amolecular weight of from 4,000,000 to 5,000,000.
(G) Talc:
FFR (from Asada Flour Milling), having a mean grain size of 0.7 µm.

Testing Methods:
(1) Melt Fluidity:
The melt fluidity of resin compositions tested is indicated by SFL (spiral flow length) thereof, as measured according to the Idemitsu method. The molding resin temperature was 240° C., and the mold temperature was 60° C. Resin samples were molded into sheets having a thickness of 3 mm and a width of 10 mm under an injection pressure of 110 MPa. The data of SFL are in units of cm.
(2) IZOD (Izod Impact Strength):
Measured according to ASTM D256. The temperature was 23° C., and the thickness of samples was ⅛ inches. The data are in terms of $kJ/m^2$.
(3) Surface Impact Strength:
Measured according to JIS K7211 in falling weight method, in which was used a 3.76 kg weight, and its dropping speed was 7 m/sec. The thickness of the test pieces was 2 mm.

(4) Surface Layer Peeling:
Moldings (test samples) were visually observed at their cross section. Those with no peeling were judged good (○); and those with some peeling layer peeling were judged bad (x)
(5) Flame Retardancy:
Tested according to the UL94 combustion test. Samples tested had a thickness of 1.5 mm.
(6) Moisture Resistance:
Samples were subjected to a exposure test at a temperature of 70° C. and a humidity of 90% for 500 hours. After the test, the samples were measured for IZOD (Izod impact strength) in the same manner as above, and for the color hue (L, a, b) according to JIS H7103 (yellowing test). For the latter, a calorimeter was used to measure the color hue of each test sample. The color change, ΔE, indicates the yellowing resistance of the sample tested.
(7) Recyclability:
Moldings (test samples) were ground and recovered. 100% ground powder was dried at 80° C. for 12 hours, and then again molded into moldings through injection molding at 260° C. The regenerated (recycled) test pieces were measured for IZOD and for the color change ΔE, according to the same methods as above.
(8) Outward Appearance:
Using an OA housing (A4-type) mold, samples were molded through injection molding at 280° C. Moldings with good appearance were judged good (○); those yellowed in some degree were judged not so good (Δ); and those much yellowed with silver marks were judged bad (x).
(9) Aging Resistance Under Heat:
Moldings (test samples) were heated at 80° C. for 500 hours. After thus heated, the samples were measured for IZOD (Izod impact strength) in the same manner as above, and for the color hue (L, a, b) according to JIS H7103 (yellowing test). For the latter, a calorimeter was used to measure the color hue of each heated sample. The color change, ΔE, indicates the yellowing resistance of the sample tested.

TABLE 1

| | | | Ex. 1 | Comp. Ex. 1 | Ex. 2 | Comp. Ex. 2 | Comp. Ex. 3 | Ex. 3 | Ex. 4 |
|---|---|---|---|---|---|---|---|---|---|
| Composition | (A) | PC | 75 | 75 | 80 | 80 | 80 | 75 | 70 |
| | (B) | HIPS-1 | 25 | 25 | 20 | 20 | 20 | 25 | — |
| | | ABS | — | — | — | — | — | — | 30 |
| | (C) | Epoxidized SBS | 1 | — | 0.5 | — | 0.5 | 3 | 1 |
| | (D) | Rubber-like Elastomer | 3 | 3 | 5 | 5 | — | 2 | 3 |
| | (E) | P-1 | — | — | 10 | 10 | 10 | — | 10 |
| | | P-2 | — | — | — | — | — | 10 | — |
| | (F) | PTFE | — | — | 0.3 | 0.3 | 0.3 | 0.3 | 0.3 |
| | (G) | Talc | — | — | — | — | — | 10 | — |
| Test Results | (1) Melt fluidity (SFL) | | 20 | 21 | 35 | 36 | 35 | 37 | 35 |
| | (2) IZOD impact strength ($kJ/m^2$) | | 80 | 60 | 75 | 50 | 40 | 60 | 80 |
| | (3) Surface impact strength (self-dropping weight test) (MPa) | | 32 | 14 | 33 | 8 | 7 | 30 | 35 |
| | (4) Surface layer peeling | | ○ | x | ○ | x | x | ○ | ○ |
| | (5) UL-94 (1.5 mm thick) | | — | — | V-0 | V-0 | V-0 | V-0 | V-0 |

TABLE 1-continued

|  |  |  | Ex. 1 | Comp. Ex. 1 | Ex. 2 | Comp. Ex. 2 | Comp. Ex. 3 | Ex. 3 | Ex. 4 |
|---|---|---|---|---|---|---|---|---|---|
| (6) Moisture Resistance | | IZOD (kJ/m$^2$) | — | — | 70 | 25 | 35 | 50 | 75 |
| | | Color change (ΔE) | — | — | 3 | 4 | 3 | 3 | 4 |
| (7) Recyclability | | IZOD (kJ/m$^2$) | — | — | 75 | 40 | 40 | 50 | 75 |
| | | Color change ΔE) | — | — | 2 | 4 | 2 | 2 | 3 |

TABLE 2

|  |  |  | Ex.5 | Comp. Ex. 4 | Ex. 6 | Comp. Ex. 5 | Ex. 7 | Ex. 8 | Ex. 9 |
|---|---|---|---|---|---|---|---|---|---|
| Composition | (A) | PC | 100 | 100 | 80 | 80 | 80 | 70 | 80 |
| | (B) | HIPS-2 | — | — | 20 | 20 | 20 | — | 20 |
| | | ABS | — | — | — | — | — | 30 | — |
| | (C) | DE-1 | 2 | — | — | — | — | — | — |
| | | DE-2 | — | — | 1 | — | — | 1 | — |
| | | DE-3 | — | — | — | — | 1 | — | 1 |
| | (D) | Rubber-like Elastomer | 5 | 5 | — | — | 5 | 3 | 5 |
| | (E) | P-1 | 6 | 6 | 10 | 10 | — | 10 | — |
| | | P-2 | — | — | — | — | 10 | — | 10 |
| | (F) | PTFE | 0.3 | 0.3 | 0.3 | 0.3 | 0.3 | 0.3 | 0.3 |
| | (G) | Talc | — | — | — | — | — | — | 10 |
| Test Results | (2) IZOD impact strength (kJ/m$^2$) | | 80 | 80 | 40 | 40 | 70 | 70 | 50 |
| | (5) UL-94 (1.5 mm thick) | | V-0 | V-0 | V-0 | V-0 | V-0 | V-0 | V-0 |
| | (6) Moisture Resistance | IZOD (kJ/m$^2$) | | | | | | | |
| | | Color change (ΔE) | 3 | 10 | 4 | 14 | 5 | 7 | 3 |
| | (7) Recyclability | IZOD (kJ/m$^2$) | 75 | 60 | 35 | 30 | 65 | 65 | 45 |
| | | Color change (ΔE) | 1 | 4 | 1 | 4 | 2 | 2 | 3 |
| | (8) Outward Appearance | | ○ | x | ○ | Δ | ○ | ○ | ○ |
| | (9) Aging Resistance under heat | IZOD (kJ/m$^2$) | 70 | 40 | 35 | 20 | 65 | 60 | 45 |
| | | Color change (ΔE) | 2 | 5 | 3 | 8 | 3 | 4 | 3 |

From the data in Table 1, it is obvious that the moldings of the thermoplastic resin composition of the invention, which comprises both (C) and (D), did not exhibit surface layer peeling and had good impact strength, especially much increased surface impact strength. In addition, from the data of the impact strength and the color change therein, it is also obvious that the moldings of the invention have good moisture resistance and good recyclability.

From the data in Table 2, especially from the data of the impact strength and the color change therein, it is obvious that the moldings of the flame-retardant polycarbonate resin composition of the invention have good moisture resistance, good thermal aging resistance and good recyclability as compared with the comparative moldings. It is further obvious that the rubber-like elastomer added to the composition much increased the impact strength of the moldings of the composition without interfering with the flame retardancy of the moldings, and that the core/shell-type rubber-like elastomer added thereto had little negative influences on the moisture resistance and the thermal aging resistance of the moldings of the composition.

As described in detail hereinabove, the thermoplastic resin composition of the invention has the advantage of good compatibility of the polycarbonate resin with the styrenic resin therein, and its moldings are not troubled by surface layer peeling and have good impact strength. In particular, the surface impact strength of the moldings of the composition is greatly increased to a level close to that needed for practical use. Even when a phosphate compound serving as a flame retardant is added thereto, the flame-retardant composition still has the same advantages as above. In particular, the moldings of the composition have good aging resistance, good thermal stability and good recyclability, and contribute to environmental protection and to energy and resources saving. The composition can be well molded into large-sized and thin-walled moldings of many applications to, for example, office automation appliances, information appliances, other electric and electronic appliances for industrial use and household use, and car parts.

The flame-retardant polycarbonate resin composition of the invention contains no halogen, and has good flame retardancy. Its moldings have good impact strength and good thermal stability. In particular, their aging resistance under heat and their moisture resistance are especially good. Owing to their thermal stability, the moldings have good recyclability. As being recyclable, the moldings contribute to environmental protection and to energy and resources saving. In particular, when a styrenic resin or a rubber-like elastomer are added thereto, the moldability of the composition is much more improved, and the moldings of the composition have much higher impact resistance and durability. The composition can be well molded into large-sized and thin-walled moldings of many applications to, for example, office automation appliances, information appliances, other electric and electronic appliances for industrial use and household use, and car parts.

What is claimed is:

1. A flame-retardant polycarbonate resin composition, comprising:

100 parts by weight of a resin or resin mixture of (A) from 20 to 100% by weight of a polycarbonate resin and (B) from 0 to 80% by weight of a styrenic resin;

from 1 to 30 parts by weight of (E) a flame retardant of an organic phosphorus compound;

from 0.1 to 10 parts by weight of (C) an epoxy modified block copolymer; and from 0.5 to 20 parts by weight of (D) a grafted core/shell rubber elastomer.

2. The flame-retardant polycarbonate resin composition as claimed in claim 1, wherein the resin mixture comprises (A) from 50 to 95% by weight of a polycarbonate resin and (B) from 5 to 50% by weight of a styrenic resin, and the styrenic resin is a rubber-modified styrenic resin.

3. The flame-retardant polycarbonate resin composition as claimed in claim 1 or 2, wherein the phosphorus-containing, organic flame retardant is a non-halogen, phosphorus-containing, organic flame retardant.

4. The flame-retardant polycarbonate resin composition as claimed in claim 3, wherein the non-halogen, phosphorus-containing, organic flame retardant is a non-halogen phosphate.

5. The flame-retardant polycarbonate resin composition as claimed in claim 4, which additionally contains from 0.05 to 5 parts by weight, relative to 100 parts by weight of the resin or resin mixture of (A) and (B), of (F) a fluoro-olefinic resin.

6. The flame-retardant polycarbonate resin composition as claimed in claim 5, which additionally contains from 1 to 30 parts by weight, relative to 100 parts by weight of the resin or resin mixture of (A) and (B), of (H) a rubber elastomer component.

7. The flame-retardant polycarbonate resin composition as claimed in claim 1, which additionally contains from 1 to 100 parts by weight, relative to 100 parts by weight of the resin or resin mixture of (A) and (B), of (G) an inorganic filler.

8. An injection molding of the flame-retardant polycarbonate resin composition of claim 5.

9. An injection molding of the flame-retardant polycarbonate resin composition of claim 7.

10. A housing or a part of an office automation appliance, an information appliance, an electric appliance or an electronic appliance, comprising:

an injection molding of the thermoplastic resin composition of claim 5.

11. A housing or a part of an office automation appliance, an information appliance, an electric appliance or an electronic appliance, comprising:

an injection molding of the thermoplastic resin composition of claim 7.

12. A flame-retardant polycarbonate resin composition, comprising:

100 tarts by weight of a resin or resin mixture of (A) from 20 to 100% by weight of a polycarbonate resin and (B) from 0 to 80% by weight of a styrenic resin;

from 1 to 30 parts by weight of (E) a flame retardant of an organic phosphorus compound;

from 0.1 to 10 parts by weight of (C) an epoxy group-containing compound component of an epoxy-modified block copolymer, which is derived from a block copolymer comprising polymer blocks with an aromatic vinyl compound as a main component and polymer blocks with a conjugated diene compound as a main component or by epoxidating the double bonds existing in its partial hydrogenate; and from 0.5 to 20 parts by weight of (D) a grafted core/shell rubber elastomer.

* * * * *